July 14, 1931.  C. ELLIS  1,814,135
COATED OR IMPREGNATED PRODUCT
Filed Jan. 5, 1927
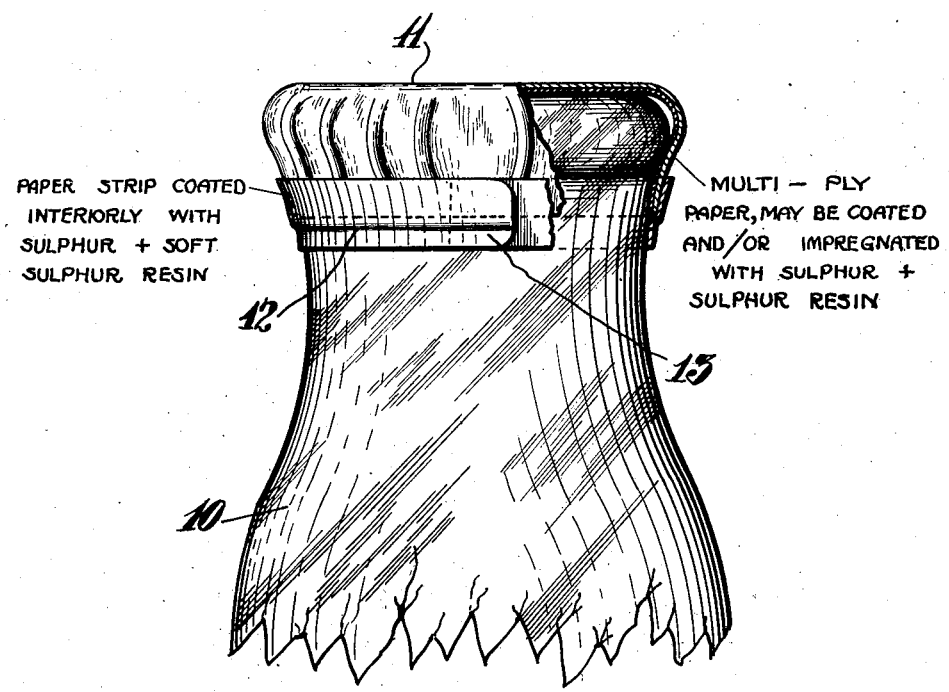
Inventor
Carlton Ellis
By A. B. Foster, Attorney Patented July 14, 1931

1,814,135

UNITED STATES PATENT OFFICE

CARLETON ELLIS, OF MONTCLAIR, NEW JERSEY

COATED OR IMPREGNATED PRODUCT

Application filed January 5, 1927. Serial No. 159,245.

This invention relates to coated and/or impregnated paper and press board and to articles shaped therefrom, and in one aspect of the invention relates to paper and products therefrom which are relatively resistant to acids, alkalis and the like. A substantial portion of the following is derived from my copending application Serial No. 428,852, filed December 7, 1920.

The invention contemplates a sheeted, rolled, pressed or otherwise shaped pulp or fibrous product containing or coated with, for example, a sulphur product such as sulphur blended with a resinous base made by reacting on a phenol with sulphur chloride forming an amorphous material whose consistency and properties vary with the content of combined sulphur.

Sulphur chloride may be used in its several forms such as the monochloride, the dichloride and also sulphur chloride containing either an excess of sulphur or an excess of chlorine. In some cases a mixture of sulphur and chlorine or of sulphur chloride, sulphur and chlorine may be employed. Other halogens such as bromine could of course be used but are too expensive for the ordinary commercial usages of resinous material, however for example sulphur bromide could be used in preparing material intended for pharmaceutical purposes.

The phenolic body employed comprises ordinary phenol or carbolic acid, cresol in its various forms, ortho, meta, or para, and mixtures of these isomers, xylenol and higher homologues of phenol, naphthol and its homologues and various mixtures of these several phenolic bodies. In the following description ordinary phenol frequently is taken as a type but it should be understood that such use is for illustrative purposes only and that other phenols may be similarly employed.

Ordinary phenol may be obtained in a state of high commercial purity as a white crystalline substance which reacts readily with sulphur chloride forming a series of bodies depending upon the amount of sulphur chloride employed. These bodies will vary in consistency from liquid, readily flowing syrups to hard brittle resinous products and the melting point will likewise vary from products melting at or below room temperature to those which are practically infusible or at least have a high melting point which is indefinite in its character. For example, a product made by treating phenol with its own weight of sulphur monochloride, (that is 100% of the latter) is of a light yellow to light brown color and of the consistency of say, molasses. That made with 150% of sulphur chloride is a sticky solid; with 200% of sulphur chloride (or twice the weight of the phenol) the product is a light yellow or light brown solid fusible resin; with 250%, the product is a hard resin and with 300% to 350%, the resin possesses a very high melting or softening point, if in fact it is not actually infusible. A solid resin is also produced with about 375% of sulphur chloride. With 400% of sulphur chloride reaction is ordinarily not complete; excess of sulphur chloride remaining and reacting slowly over a period of days or weeks causing expansion and foaming of the resin with the constant evolution of hydrochloric acid. The resin made with 400% sulphur chloride is moreover considerably softer than that made with 350%. In referring to these properties it may be noted that the resin is prepared in the above instances by melting the phenol and running in the sulphur chloride as rapidly as is feasible, consistent with the foaming which occurs due to the evolution of hydrochloric acid. The mass is allowed to heat spontaneously when preparing small batches but in case of larger batches a water jacket may be used for cooling and the temperature kept below that at which any discoloration or carbonization would occur. In case of large batches also the temperature may be prevented from rising too high, by the introduction of solvents especially those which are not affected by sulphur chloride, benzol or toluol being useful for the purpose.

The hydrochloric acid which is evolved is anhydrous and may be used for preparing anhydrous compounds or as a condensing agent or it may be passed into water to make the ordinary solution of hydrochloric acid.

In this case it is desirable to pass the gas through a purifier to remove any traces of sulphur chloride which may be carried over. When the sulphur chloride falls into the molten phenol the reaction is violent and the phenol is thrown about violently so that care should be taken to have the vessel enclosed or the operator properly protected. The violence of the reaction is reduced by adding a solvent such as benzol to the sulphur chloride.

Whenever possible I prefer to carry out the operation without the use of solvents if the product desired is a solid resin as this eliminates the step of evaporation of the solvent.

The reaction appears to be that of linking up the phenol groups by means of sulphur with the elimination of hydrogen and chlorine from the reaction mass as hydrochloric acid.

The percentage of sulphur as stated varies with the amount of sulphur chloride and products containing as high as 60% or more of combined sulphur may be obtained by using between 300 and 400% of sulphur chloride. The solubility in various solvents varies with the content of sulphur and also on another factor, namely, the time of exposure to the hydrochloric acid fumes, and perhaps also on other factors. Resins containing a low percentage of sulphur as for example those made up with 150% of sulphur chloride usually are readily soluble in alcoholic solvents such as methyl and ethyl alcohol, denatured alcohol, acetone and higher ketones, methyl and ethyl acetates etc. They also dissolve readily in benzol and toluol and in mixtures of hydrocarbons such as benzol or its homologues and alcoholic bodies. As the percentage of sulphur increases, the product becomes less soluble in alcohol but is still fairly soluble in esters such as methyl or ethyl acetate. However a product made with 300% or 350% of sulphur chloride which has been allowed to stand for several days without washing out the acid is practically completely insoluble in all the common solvents or mixtures of such solvents. It does not dissolve in alcohol or benzol or in mixtures of these nor in ethyl acetate. On the other hand if the resin when freshly made is flooded with the solvent it will be found that such resins made with 250%, 300% or 350% of sulphur chloride will dissolve giving light yellow to light brown solutions which dry to form a hard surface having unusual properties. In preparing the harder resins mixed solvents are generally recommended and are in fact in most cases essential. A 300% or 350% resin (and by that term I mean a resin made with this percentage of sulphur chloride) will not under any conditions dissolve readily in denatured alcohol but when freshly made dissolves quite easily in a mixture of equal parts alcohol and benzol or in a mixture of like proportions of ethyl acetate and chlorbenzol or in acetone and toluol. The proportions of the solvent may be varied considerably and still have desirable solubility as for example one part of the alcohol, ketone or ester to three parts of the hydrocarbon or one part of the latter to three or four parts of the alcoholic body etc. The effect of adding the second solvent is very striking, a turbid solution and suspension of the resin in benzol is immediately cleared by the addition of a little alcohol or a similar suspension in alcohol is cleared by a small amount of benzol.

The softer products such as the syrupy materials with 100% or so of sulphur chloride may be used in coating compositions where stickiness is desirable as for example in the manufacture of sticky fly paper. They may also be used to impregnate cloth or other textile material to form a preservative medium. The resins of greater consistency such as the 150% or 200% resins may be melted and coated on paper or other surfaces, no solvent being employed. Textile material likewise may be impregnated with such molten solutions. The harder resins generally speaking are however not capable of being handled in this way owing to their high melting point, in fact if they melt at all without decomposition. These resins may however be fluxed with certain materials such as sulphur, especially the plastic form, and other fluxing agents as will be subsequently mentioned. However when a particular object of the invention as set forth in Serial No. 428,852 is to produce workable solutions of these higher melting point resins which can be employed as varnishes or as vehicles for pigments or for impregnation purposes to avail of the valuable and unusual properties of the resins which contain a high percentage of sulphur the following procedure may be adopted. The phenol is treated with between 200% and 400% of sulphur chloride and immediately subjected to the action of a composite solvent to bring about solution of such resin. It may be noted that the alcohol, ketone, or esters used should be quite free from water if best results are to be obtained in the use of the product as a varnish. Any great amount of water in these solvents causes the surface to ripple or dry unevenly, and hence fairly dry solvents should be utilized. This does not mean however that such solvents are necessarily anhydrous but that care should be taken in mixing to see that for example alcohol having water in sufficient amount to cause rippling is not employed.

These sulphur phenols such as the high sulphured carbolic acid, cresol etc., exhibit properties which are not common to any of the natural resins, for example, they are not soluble in carbonate or bicarbonate of soda or potash nor do they dissolve in ammonia. In this respect they are decidedly different from shellac which quickly dissolves in such alkalis forming purple solutions. Almost all the natural resins contain enough resin acid to be promptly affected by alkali. Thus solutions of some of these sulphur resins may be applied to wood or other surfaces and allowed to thoroughly dry and then may be exposed to strong solutions of soda or ammonia without being corroded and discolored. Surfaces varnished with such material may therefore be used in kitchens or other places where the wood work is frequently scrubbed with strong soap solutions, washing powders, ammonia and the like. Or the coating may be used in ammonia works or other places where various alkalis are being manufactured or used. Or the solution may be employed to coat tanks or concrete vats etc. to hold mild alkaline solutions. The resin is soluble in caustic soda solutions so that care should be taken that these do not come in contact therewith.

A further desirable property of such high sulphur resin is its resistance to acids, it is not affected by concentrated hydrochloric acid or by either dilute or concentrated sulphuric acid. Concentrated nitric acid discolors the resin but does not act upon it violently. The lack of action of concentrated sulphuric acid on the resin is remarkable; fragments of the resin having been kept at room temperature in this acid for weeks without any change in their appearance or any discoloration of the acid. When the acid is heated to a high temperature it reacts upon the resin forming a blue solution. The low sulphur resins are readily attacked by the acid forming this blue solution. The color of the products formed by the action of the acid varies with the phenolic body from which the resin is made, the foregoing applying to the resinous product made by the treatment of high grade phenol.

Wood varnished with the resin and time being given for the solvent to dry out thoroughly, so that the latter would not be affected by acid, was flooded with strong sulphuric acid and at the end of several hours the coating was washed and found to be intact, in fact showing just as high a gloss as at the beginning of this test. Shellac is immediately blackened by sulphuric acid and a shellac surface is quickly destroyed. The same applies to many other varnish coatings. It is thus possible with the high sulphur resin to prepare solutions which may be used to coat wood work, metals and the like with a varnish which resists the action of various acids. For example I have coated ordinary letter paper with a solution of the resin, allowed to dry thoroughly and formed the coated paper into a receptacle which would hold concentrated sulphuric acid. In another case paper was coated on one side with the varnish solution and after drying was placed in concentrated sulphuric acid, the latter attacked the paper dissolving it and leaving a glossy film of the resin quite unharmed. Paper which has been well impregnated with the solution so that the fibres are thoroughly covered makes a suitable acid resistant material for wrapping bottles etc. or acid salts. Cloth or burlap may be impregnated with the resin and used for bagging purposes to hold acid sodium sulphate, superphosphate or other acid fertilizers.

As stated the low sulphur liquids or resins are affected by sulphuric acid. Phenol products made with 100% of sulphur chloride turn blue on contact with the cold concentrated acid, in fact there is more or less action up to about 250% of sulphur chloride. The 300 and 350% products which contain around 60% of combined sulphur are the most resistant and best adapted for operations where concentrated acid is liable to come in contact with a coating or impregnation of this material. However the lower sulphur resins may be used in various ways depending upon the particular acid which is being employed. Hydrochloric acid is resisted by the lower sulphur resins, and a 200% or 250% resin is fairly resistant to the sulphuric acid of around 40% strength ordinarily used in storage batteries. As there are some uses for resin which should be quite plastic instead of brittle it is often desirable to make mixtures of the liquid material or the soft resin and the hard resin which will have a desired plasticity for certain purposes. Plastic sulphur may also be incorporated with the hard resin to soften it. The resin has the property of retaining, to a very considerable degree, sulphur in a plastic condition. When the latter is heated to render plastic and allowed to stand it usually loses its plasticity in several hours but when mixed with for example an equal amount of the resin the plasticity is held indefinitely.

The resin is also fairly resistant to petroleum hydrocarbons and is not dissolved by gasoline or kerosene. If ordinary benzine is added to a solution of the resin in benzol or a mixture of benzol and alcohol the resin is precipitated. This property permits of using the resin as a coating for tanks or articles which come in contact with petroleum oil products. It also makes possible the use of the resin for containers for fats, greases, lard, tallow, butter etc., or for paper used for wrapping the latter. Thus paper containers may be made up and dipped into a solution of the resin to make a suitable oil proof receptacle; or the paper may be coated or impregnated with the resin or a solution of it and made up into a can, box or other package.

The softer and more fusible resins may be deodorized by blowing with air or steam and especially superheated steam, a vacuum being employed if desired. The harder resins may be pulverized and boiled or steamed to wash out excess acid and odoriferous bodies.

In the case of phenol resins, as stated, light yellow solutions may be prepared, these in fact closely approximating the color of solutions of bleached shellac. This light yellow color appears ordinarily however only when the resin has an acid reaction. A solution made up from a freshly prepared resin will be acid due to the presence of some hydrochloric acid and usually it is desirable to neutralize such acid. If this is done with soda, borax, oxide of magnesia or other body of generally alkaline properties the light yellow color will change to brown after the acid has been neutralized. While this color is not objectionable for some purposes it is frequently desired to have a light colored solution. In fact in the varnish field, other things being equal, varnishes are usually graded according to their color. Hence in order to maintain the acid reaction and still have present no corrosive acid I prefer to add to the finished solution a small amount of a salt of an organic acid, preferably sodium acetate. This reacts with hydrochloric acid liberating acetic acid which being volatile departs with the solvents in the course of time so that the film contains no corrosive mineral acid and at the most only faint traces of acetic acid. In employing sodium acetate care should be taken that the salt used is neutral or acid as sodium acetate often is found which has alkaline reaction and this will color the solution if used in sufficient quantity. Other salts such as sodium or potassium tartrate, stearate, oxalate and the like may be used but these leave fixed acids in the film which is not always desirable. The acid also may be removed by neutralizing with for example soda ash forming the brown color and then bringing back the color by the addition of enough acetic acid to overcome the alkalinity, and make the solution of substantially neutral or slightly acid reaction.

The solutions may be colored with suitable dyes to give desired shades for purposes of staining, or pigments may be employed which are compatible with such solutions, bearing in mind that while the combined sulphur is in a relatively stable form there is not infrequently a small amount or traces of free sulphur or sulphur compounds which will react with pigments such as white lead causing them to blacken. For this reason zinc oxide, lithopone and the like are best used as pigments and extending materials such as barytes, silex etc. may be added. As one of the features of certain solutions of this resin is its acid-fast qualities a pigment may be used which is resistant to acids, such as titanium oxide or similar acidic bodies.

Sometimes when dissolving the resin in, for example alcohol, a small amount of hydrogen sulphide is evolved and this may be removed by treatment with lead oxide, zinc hydrate etc. This hydrogen sulphide apparently comes from a trace of impurity in the resin.

While the resin may be prepared as indicated in the foregoing by slowly adding sulphur chloride to the phenol with stirring and cooling, if necessary, however, as stated, solvents may be employed during its preparation in order to allow the agitation to be more effective and to permit of the resin being run out of the container easily. Thus the resin may be prepared by mixing phenol with an equal amount of benzol, adding the sulphur chloride and then in the case of a high sulphur resin adding alcohol or other suitable alcoholic body, thus very quickly preparing the solutions. The latter may be blown with air or neutralized to eliminate the hydrochloric acid and is then ready for use as a varnish coating or for other purposes. In using this method to make the high sulphur resins, the sulphur chloride does not react readily toward the end of the operation and more time is required or a higher temperature may be required to complete this action. Hence benzol may be too volatile to maintain the requisite temperature and a solvent such as toluol, xylol or solvent naphtha may be used thus allowing the temperature to rise to a higher point and thereby securing more effective combination.

In the foregoing I have mentioned the use of fluxing agents for the high melting point resins. If a 350% resin is strongly heated by itself it does not fuse to a clear liquid but swells and darkens. If a direct flame is applied to a mass of the resin it does not catch fire readily, in fact considering the large amount of sulphur present in the combined form, it seems remarkably uninflammable. Free sulphur is quite quickly ignited by means of a naked flame but I have applied the flame of a Bunsen burner directly to a mass of the phenol resin containing over 60% of sulphur but have been unable to ignite it, the mass intumescing and blackening without flame. When the resin is well mixed with certain fluxing agents it may be melted down to a clear resinous mass. Among suitable fluxing agents are camphor, triphenylphosphate and tricresylphosphate, also the soft sulphur resins and plastic sulphur as noted above. Camphor has a pronounced softening action on the resin, triphenylphosphate is liable to produce resin having a slightly crystalline texture. Tricresylphosphate softens the resin in a manner similar to camphor.

These softened resins may be put into solution in suitable solvents in the same manner as the unfluxed resin. The use of oils such as linseed, cod and castor oil and also of other resins such as the various natural resins or artificial resins made in other ways is not excluded from the field of the present invention.

Soft compositions suitable as pitches to coat the sides of vats or the interior of barrels may be prepared as will be evident from the foregoing. As the resin has a desirable germicidal or insecticidal action it has numerous sanitary applications.

Although the higher sulphur resins are comparatively hard and brittle it may be noted that coatings of the resin on paper show a very satisfactory degree of flexibility. For this purpose 250% resin may be employed with good results or if an acid fast surface is desired preferably the 300% resin is employed. A solution for this purpose may be made with a solvent composed of equal parts of benzol and denatured alcohol. After making and neutralizing free hydrochloric acid the solution is allowed to stand to deposit any traces of insoluble matter. As noted above the protracted action of hydrochloric acid forms an insoluble resin and this action goes on to some extent while making up the high sulphur resins so that from traces to substantial deposits of the insoluble polymer or whatever it may be are noticed in practically all of the solutions made up from certain of the high sulphur resins. Hence settling or passage through a filter press is desirable in order to produce clear solutions.

In some cases on settling a slight deposit of sulphur is obtained. For example 500 grams of phenol was treated with 1500 grams of sulphur monochloride, the latter being added gradually and as soon as the resin was prepared it was treated with the following solvent mixture, 625 c.c. benzol, 625 c.c. denatured alcohol and 100 c.c. ethyl acetate. The resin and solvent was heated until the solvent boiled gently. This was continued for three-quarters of an hour with the result that the resin went practically entirely into solution. The color of the solution was light brown and it had considerable body or viscosity. On standing over night a yellow deposit was observed. This was found to be soluble in carbon bisulphide and crystallized therefrom with the characteristic crystalline appearance of sulphur. This deposit burned with a blue flame giving off sulphur fumes. It was supposed that in view of the presence of free sulphur in the solution that the latter would react with lead pigments causing darkening. Such however was not the case. The clear solution was decanted from the sulphur crystals and portions mixed with pigments such as litharge and after standing two weeks no darkening of the pigment was observed. Mixtures also were prepared with pigments the metal base of which does not form black sulphides, e. g. zinc oxide and lithopone. These are likewise unchanged in color. A portion of the same solution was shaken with lead acetate solution and allowed to stand for two weeks at the end of which time the lead acetate solution had changed only very slightly in color being tinted a very light brown.

A quick setting resin solution may be produced by having a non-solvent of the resin present. Turpentine for example will serve or in some cases gasoline may be used. These non-solvents may be added to the extent of say 20 or 25% it more or less depending upon the other solvents employed. For example 300% resin when freshly prepared was ground in water in a ball mill for about 3 hours until the particles of resin were reduced to a state of extreme fineness. This material was then washed thoroughly with water by which means practically all the acid was removed. The resin was thoroughly dried. In this condition the resin will hold its solubility indefinitely. A portion of this resin was dissolved in a mixture of toluol 2 parts by volume, ethyl acetate 2 parts and turpentine 1 part. When this solution is applied to a suitable surface it quickly sets owing to the effect of the non-solvent; the result being an appearance of quick drying. The resin thus set will gradually harden as the solvent evaporates.

The acid-fast resin may be used in the preparation of primers, enamels and mastics, both cold and hot mastics, for such purposes as making acid-resistant tanks or for flooring purposes in buildings where acids are employed.

In the preferred form of the invention the resin employed for acid resistant purposes contains over fifty per cent of combined sulphur and preferably between fifty and seventy per cent, the specific resin best adapted for many uses containing about 60 per cent of sulphur.

The foregoing, taken substantially from my co-pending application 428,852 filed December 7, 1920, indicates the utility of various sulphur bodies in coating paper and in making receptacles water resistant, and if desired, acid resistant.

Additional co-pending applications including Serial Nos. 607,909, 609,133, 610,042, 12,360, 21,425, 38,085, 153,191 suffice more fully to set forth the properties of sulphur resins and other sulphur compounds appropriate for the purpose and to elaborate the peculiar qualities of compositions containing sulphur and a sulphur resin; furthermore, to disclose the valuable qualities of paper or pressboard coated and/or impregnated with such compositions. On the basis of the findings that water resistance or acid resistance, as the case may be, is secured by the treatment of paper or pulp with modified sulphur much depends upon that which is set forth in the present application. Receptacles of various types, including cups, ramekins, soup bowls, plates, spoons, flower pots, and the like, sufficiently resistant to moisture, or, in some cases, to hot water, are obtainable, even when using such crude forms of paper as those made to a very large extent from ground wood pulp.

An inverted receptacle of the ramekin type serves as a hood cap for bottles such as milk bottles.

The methods which may be employed to obtain a coating or impregnation of paper or pressboard may be the following:

1. To obtain a glazed surface of sulphur and sulphur resin a fairly good proportion of the latter should be present as the resin is less penetrating than molten sulphur and tends to produce more of a surfacing effect in proportion to the amount present. The paper or pressboard is immersed in a bath of the resinated sulphur maintained at a temperature, say, 10 to 20° C., above the melting point. After such immersion the sheets or articles may be drained or centrifuged and chilled by cold air or by dipping into cold water, or by spraying with water. This causes the surface coating to set and a lustrous glazed effect results.

2. Another method is that which comprises passing a web of paper material continuously or progressively through a bath of molten sulphur or resinated sulphur, preferably at a temperature below that at which the sulphur assumes the plastic condition, preferably at the temperature of minimum viscosity and permitting impregnation to progress to a substantial degree, preferably to the point of maximum rigidity. In most of the articles produced, rigidity is of importance. This is the case with cups, bowls and particularly spoons. The surface of sulphur composition preferably should be removed as in the present procedure, which may be accomplished by passing through squeeze rolls or scrapers. However, the latter treatment may remove surface sulphur which the paper can absorb, as a simple immersion of the paper does not always produce saturation. By heating the paper at a temperature somewhat above the melting point of the sulphur or resinated sulphur absorption of the surface sulphur will take place and a clean looking surface will result free from spots or globules of sulphur. While such paper is still hot and plastic it may be stamped, drawn or punched, folded or worked into the final form of container, implement, or whatever article is to be produced.

3. In some cases it is more effective to stamp the article out of paper and then impregnate it with the composition. If such article is to be prepared in glazed form, the procedure set forth under No. 1 may be utilized. If, however, rigidity only is desired and no glazed effect, in other words, if a paper-like surface is to be secured, the sulphur or sulphur composition remaining on the surface of the paper should be either removed or absorbed. Considering for example the manufacture of paper spoons which have to be made very rapidly and cheaply, it is scarcely feasible to attempt to clean away surface sulphur. On the other hand such surface sulphur may be eliminated from the surface by a digestion or absorbing treatment in which the impregnated article, as, for example, a spoon, is heated to a point at which the sulphur or sulphur composition is liquefied and gradually this surface material is absorbed, so that eventually the spoon appears to be made merely of paper. Nevertheless, when cold it may be found to possess a high degree of rigidity so that it can be used in consuming hard ice creams on the one hand, and on the other hand may be placed in hot aqueous foodstuffs such as soups, tea, and the like, without any substantial softening.

Thus, by procedure No. 3, spoons may be stamped out at a high rate of speed from punching and shaping machines, the spoons charged into baskets which are dipped in the molten sulphur or resinated sulphur and allowed to remain until impregnation has taken place to a substantial degree, but preferably not to the point of complete saturation. The basket of spoons then is removed from the sulphur bath and centrifuging or other means is employed to drain off superfluous sulphur as far as possible. The spoons then are passed on a conveyor through a hot chamber or are tumbled in a heated drum until the spottiness of the surface due to sulphur adhering here and there disappears and a clean surface of a uniform paper-like appearance results. Such spoons, may, if desired, be treated with a small amount of wax and tumbled in a hot or cold drum to give an improved surface finish. This, however, is not necessary.

In carrying out procedure No. 3, where complete absorption is required and usually a high degree of rigidity, pure clean sulphur by itself may be employed or a composition of sulphur and the sulphur resin, the latter being in comparatively small proportion, in order that the viscosity of the solution may not be too great. Furthermore, since utensils such as spoons, teacups, and soup bowls are required to stand water at a temperature near the boiling point, I prefer not to employ such an amount of sulphur resin that the melting point of the resinated sulphur is much below 100° C.

Composite treatment may be carried out by impregnation with straight sulphur and glazing with resinated sulphur. This procedure may be employed to advantage with pressboard, wallboard, zinc shingles, and the like, which are capable of absorbing a considerable amount of sulphur per unit of surface area. The sulphur which is present as an impregnum gives rigidity and the resinated sulphur, with or without a pigment or dyestuff, provides a decorative glaze and waterproof finish. Furthermore, the presence of the sulphur resin in substantial amount in the sulphur has fire retarding effect, which is important in some cases. Pressboard may be thus treated to produce square or rectangular pieces suitable for advertising signs. It should be noted that linseed oil paint does not dry very readily on contact with pressboard which has been impregnated with sulphur. The latter appears to be an anti-catalyst of oxidation. I have observed, however, that nitrocellulose lacquers and lacquer enamels may be applied to the surface of pressboard treated with sulphur or resinated sulphur and that a quick drying good adhering decorative finish is thus obtained.

The procedure of impregnation with sulphur and glazing with resinated sulphur may be applied to the treatment of large receptacles molded from pulp. Also, paper tubes or pulp tubes intended for use as conduits and ordinarily impregnated with asphalt, and the like, may be impregnated with sulphur and subsequently glazed with resinated sulphur, or resinated sulphur may be used throughout. The treatment of thick-walled articles may be carried out by pressure or vacuum impregnation.

Since mixtures of sulphur and sulphur resin are substantially cheaper than the sulphur resin alone, I prefer to use the maximum proportion of sulphur consistent with the properties required. Sulphur does not mix with many substances, in fact, repels most organic bodies such as most resins, waxes, and the like, unless the temperature is raised to the vulcanizing point, in which case some chemical intermingling may result. However, the two stage method of treatment, namely, impregnating with sulphur and giving a finish with some other material cannot be expected to yield the most satisfactory results when the materials employed in the second step are not miscible with sulphur. In the present invention I have at hand the various sulphur containing bodies which mix with sulphur in all proportions and therefore such two stage processes are feasible, effective and capable of numerous variations which need not be set forth herein.

One of the cheapest sulphur resins available for the purpose is that made from tar acids and sulphur chloride, with, for example, equal parts of each ingredient. The tar acids usually contain a considerable proportion of xylenol and the product therefore may be termed crude xylenol sulphur resin. Mixtures of 1 part of the latter to 3 or 4 parts of sulphur check the crystallization of the latter and yield a resinated sulphur. In other words, by introducing this amount of the xylenol sulphur resin the sulphur itself acquires the properties of a resin.

So far as I am advised, I am the first to thus so modify the physical properties of sulphur that it may be classed with resins from the physical standpoint.

Used in smaller proportions the sulphur resin may not entirely preclude crystallization when large masses of the product are allowed to cool from the molten condition. In such cases whenever cavities form there may or may not be present very slight indication of crystallization. This, however, is quite different from the degree of crystallization which results when straight sulphur solidifies in mass from the molten state. The cavities which appear in the latter case are usually heavily marked by projecting and interlacing crystals. Moreover, the addition of smaller proportions of resin than that required to completely suppress crystallization brings about a modification of the melting point or softening range and the tendency is that broadening of the softening range occurs to some extent in proportion to the amount of sulphur resin present. Thus, sulphur, which, let us say, melts at about 120° C., will when mixed with say 25 per cent of the sulphur resin, exhibit a softening point of about 110° C. However, the pure sulphur will melt comparatively sharply, while the resinated sulphur will soften over a range of several degrees and having that rather indefinite melting point which characterizes most resins.

Thus, the sulphur acquires another physical characteristic of the resins themselves.

The lowering of the melting point is important in the case of some fibres or tissues which will be harmed by an impregnation treatment with straight sulphur. The ability or the property of the sulphur-containing resin or other appropriate sulphur compound, to adjust the melting point of sulphur, as it were, to each particular operation is of significance from an industrial standpoint.

A form of hood cap for bottles, especially bottles adapted for containing milk is made from paper composed of two ply paper stock impregnated with sulphur or resinated sulphur or other appropriate binder. The two plies of the paper may be of dissimilar stock, for example, the inner one may be of ground wood material or any rather low grade of pulp, while the outer one may be made from sulphite pulp and may be considerably lighter in color. Such two ply paper may be made on the paper machine by sheeting together two layers of the dissimilar paper pulp. In some cases, more than two plies or layers of paper material may be built up to form the product which in the present invention is treated with a binding and stiffening agent. In a similar manner, cups, plates, and the like, made from such two ply paper may be stiffened and waterproofed with sulphur or resinated sulphur, or other appropriate stiffening or waterproofing agent. Furthermore, paper spoons may be made in this manner using a light colored paper stock to form the upper side of the spoon and a cheaper and more readily impregnated paper stock for the under side. When treating such two ply spoons with sulphur or resinated sulphur, impregnation takes place more readily in the lower layer and the upper layer therefore is scarcely discolored by the presence of the agent conferring rigidity.

More than two plies or layers of paper may be used in this manner, the plies being formed on the paper machine, or, if desired the plies being prepared by sticking together sheets of paper material to yield a laminated product. The employment of two sheets of paper waterproofed in any suitable manner and stuck together by means of sulphur and particularly resinated sulphur owing to its good adhesive qualities, makes a very desirable material to use for hood caps to be used on milk bottles.

Hood caps for milk bottles need to be especially resistant to water because they are frequently packed in ice for some time and a hood cap should not loosen on submergence in water for ten or twelve hours. A hood cap composed of a single layer of paper impregnated with a wax such as carnauba wax, and especially those having merely the skirt of the cap impregnated with wax rather quickly loosen when the capped bottle is submerged in water. Swelling of the fibre rather soon brings about such dislodgment. Carnauba wax has very poor adhesion to glass, and in fact peels from it very readily. Hence, when the cap commences to swell on being submerged in water detachment from the glass very soon occurs.

In the preferred form of the present invention a two ply or duplex cap composed of two sheets of paper, each preferably waterproofed in some suitable manner, and the inner sheet preferably containing some agent which secures adhesion to glass may be used, the two sheets of paper being cemented together with a rather heavy layer of sulphur or preferably resinated sulphur. In some cases these may be made by first forming the paper into the shape of ramekins of a size suitable for fitting on the mouth of a milk bottle and coating one of these ramekins on the outside with molten resinated sulphur. This I have accomplished readily by means of a suction tube which rests on the inner bottom of the ramekin and by means of which suction tube I hold the ramekin in an inverted position and can thus dip it readily into a bath of the molten sulphur or resinated sulphur. Care is taken not to plunge the ramekin so far into the bath that a coating of the binder extends to the extreme edges of the skirt. The externally coated ramekin is lifted from the bath by means of the suction tube, and is quickly inserted into a second ramekin which has no coating. The two are pressed together forming a unitary cap having remarkable resistance in water submergence tests. Usually these will remain tight on the bottles for a period of at least seventy-two hours when submerged.

In the practical manufacture of such duplex hood caps, I propose to employ the suction tube referred to as a part of the mechanical appliance which will draw the caps to shape ready to be cemented together.

Owing to the more adhesive qualities of resinated sulphur such duplex caps are made to good advantage therewith. Another feature of the sulphur resin is its disinfecting qualities. Thus, when using a mixture of sulphur and the phenol or xylenol sulphur resin, I may obtain a hood cap composed of paper containing a binding agent and a disinfecting material, said hood cap being intended for use in covering the mouths of paper stoppered milk bottles in order to serve as a protection of the bottle mouth and paper disc seal or stopper from contamination by dirt, bacteria and handling in shipment. In one form of the present invention I contemplate a hood cap of ramekin shape carrying a resinous binder having disinfecting properties, also a duplex hood cap of ramekin shape having a binder possessing similar qualities, such hood cap withstanding submergence test referred to above for a period of at least ten hours.

A form of resinated sulphur which may be prepared advantageously for employment in connection with some of the above articles is made by heating phenol or other phenolic body with a great excess of sulphur in the presence of a small amount of a catalyst such as a caustic alkali. Thus, phenol 1 part may be heated with sulphur 4 or 5 parts by weight, in the presence of 2 or 3 per cent or more of caustc soda, the temperature being raised to about 200° C. and maintained at that point until hydrogen sulphide has largely ceased to be evolved. In this manner a resinated sulphur is obtained simply and cheaply.

A form of hood cap protecting the bottle mouth from contamination is made by shaping paper (which may be an ordinary translucent waxed paper or may be multi-ply, e. g. two-ply, paper if desired, or any other suitable kind of paper), into the form of a ramekin, applying it to the mouth rim of the bottle and fastening the skirts of the cap securely below the rim by means of a strip of strong flexible waterproof paper carrying a water-resistant adhesive on the inner side. A ramekin is of course composed of a piece of paper which when spread out flat is virtually a circular disc. This is bound around the skirt with the ends of the strip overlapping a half inch to about one inch and the cap thus taped is well sealed from dirt. A paper tape one half inch in width and somewhat longer than the circumference of the neck of the bottle may be used. The adhesive which I prefer on the inner or binding side of the paper tape is a mixture of sulphur and soft sulphur resin in proportions to become very sticky on warming. The caps may be applied to the bottles mechanically and a roll of the tape, unwound portions of which are heated as required by an electric heater, automatically supplies tape to render the cap secure. The operation thus may be carried out manually or by automatic capping apparatus. Since the tape has adhesive throughout its length, the skirt of the cap is bound in place at all points.

The annexed drawing illustrates one particular example, it being understood that this is given for the purpose of illustration only, and not as limiting the invention thereto. In said drawing, the figure illustrates the top of an ordinary form of milk bottle, carrying a cap in accordance with the present invention. In said drawing 10 illustrates the upper part of the common form of milk bottle. 11 illustrates a cap, which is here shown as being made of two-ply paper, which may be impregnated, or coated or both impregnated and coated with a mixture applied in a molten condition, of sulphur and a resin made as herein described. 12 shows a band, made for example of strong paper, coated interiorly with a mixture of sulphur and soft sulphur resin, which mixture will soften at a temperature somewhat below the boiling point of water. The strip is a little longer than the periphery of the bottle so that the part 13 of the strip laps upon itself.

The drawing is partly in section and partly in elevation.

In said drawing the thicknesses are considerably exaggerated, for the purpose of better illustrating the invention.

In certain of the appended claims, I employ the term "resinated sulphur" to designate a product containing sulphur and a resin which is, in a molten state, readily miscible therewith, giving a molten mixture which does not separate upon cooling. It is characteristic of such miscible or sulphur-soluble resins, that they prevent or greatly delay the crystallization of sulphur.

Since the various devices, such as tanks, vats, paper for wrappings, cloth for bags, containers of various sorts, cans, boxes, barrel or box linings, hood caps for bottles, paper utensils such as plates, cups, spoons, bowls, ramekins, etc., paper or pulp tubes, paper sealing tape, etc., all may be used as containers or as parts of containers, I hereinafter employ the term "container element" as referring to such devices and the like.

What I claim is:—

1. A hood cap for bottles comprising paper composed of two plies of dissimilar paper stock, impregnated with resinated sulphur.

2. A container element comprising paper composed of at least two plies of dissimilar paper stock, impregnated with a stiffening and sealing agent comprising sulphur and a crystallization-retarding agent blended therewith.

3. A container element comprising paper composed of at least two plies of dissimilar paper stock, one of said plies being of a better quality paper and lighter in color, said container element containing resinated sulphur as a stiffening and waterproofing agent.

4. A shaped article comprising paper composed of two plies of dissimilar paper stock impregnated with a stiffening agent comprising sulphur and a material blended therewith which is soluble in molten sulphur.

5. A skirted hood cap for bottles, bound in place by a strip of sheet-form fibrous material encircling the skirt of the cap, and being coated on its inner surface with a mixture of sulphur and a sulphur resin which mixture is sticky and adhesive when warm.

6. A skirted hood cap for bottles, bound in place by a strip of strong sheet-form fibrous material encircling the skirt of the cap, and being coated on its inner surface with a sealing mixture including sulphur and a substance which is soluble in molten sulphur and which can remain thoroughly blended therewith upon resolidification, such mixture being sticky and adhesive when warm, and being resistant to water.

7. A taped hood cap for bottles comprising a hood cap and a tape surrounding the skirt portion of the same, which tape carries a water-resistant adhesive which is sticky when hot and which solidifies on cooling, thereby forming a seal which shows whether the same has been tampered with.

CARLETON ELLIS.